(12) United States Patent
Livne et al.

(10) Patent No.: US 10,860,233 B2
(45) Date of Patent: Dec. 8, 2020

(54) HALF-MATCH DEDUPLICATION

(71) Applicant: Samsung Electronics Co., Ltd., Suwon-si (KR)

(72) Inventors: Noam Livne, Ramat Gan (IL); Jun Jin Kong, Yongin-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 16/382,374

(22) Filed: Apr. 12, 2019

(65) Prior Publication Data

US 2020/0326869 A1 Oct. 15, 2020

(51) Int. Cl.
*G06F 3/06* (2006.01)
*G06F 16/22* (2019.01)
*G06F 12/10* (2016.01)

(52) U.S. Cl.
CPC .......... *G06F 3/0641* (2013.01); *G06F 3/0608* (2013.01); *G06F 3/0659* (2013.01); *G06F 3/0673* (2013.01); *G06F 12/10* (2013.01); *G06F 16/2255* (2019.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 8,290,911 B1* | 10/2012 | Janakiraman | ....... | G06F 16/1752 707/640 |
| 8,447,740 B1* | 5/2013 | Huang | ................ | G06F 16/1756 707/692 |
| 2010/0125553 A1* | 5/2010 | Huang | ................ | H03M 7/3091 707/661 |
| 2012/0016882 A1* | 1/2012 | Tofano | ...................... | G06F 7/00 707/747 |
| 2015/0088840 A1* | 3/2015 | Eshghi | ................ | H04L 67/1097 707/692 |
| 2015/0220554 A1* | 8/2015 | Kishi | .................. | G06F 16/1752 707/692 |
| 2018/0173731 A1* | 6/2018 | Nazari | .................. | G06F 16/215 |

OTHER PUBLICATIONS

Daniel K. Blandford et al., "Compact Dictionaries for Variable-Length Keys and Data, with Applications", ACM Transactions on Algorithms (TALG), vol. 4, Issue 2, May 2008, Article No. 17.

* cited by examiner

*Primary Examiner* — Kevin Verbrugge
(74) *Attorney, Agent, or Firm* — Harness, Dickey and Pierce, P.L.C.

(57) ABSTRACT

A memory system may include a memory device configured to store data received from a host; and a memory controller configured to, receive a received block of the data and a logical address associated with the data from the host, detect at least one halves of the received block as being duplicate halves based on whether a respective one of the at least one halves of the received block match one or more existing halves of stored blocks stored in the memory device, selectively store the at least one halves of the received block in the memory device based on whether the respective one of the at least one halves are duplicate halves such that the duplicate halves of the received block are not stored in the memory device, and store metadata associated with retrieving the received block.

20 Claims, 5 Drawing Sheets

HALF-MATCH DEDUPLICATION

BACKGROUND

Example embodiments relate to a memory device, a method of operating the same, and a storage system including the same. For example, at least some example embodiments relate to a memory system configured to perform half-match deduplication, a method of detecting half-matches in a memory system, and a memory controller configured to perform the same.

Duplicate data may exist when, for example, small changes are made to a large file and resaved as a separate file, or when a same attachment is sent to multiple users of the same mail server. In such a scenario, the same bit pattern may exist hundreds or even thousands of times. Storing this duplicate data multiple times in a memory system may cause significant waste of resources in terms of storage costs and/or backup speeds.

Data deduplication techniques may be utilized to determine whether the data to be stored in the memory system matches data already stored in the memory system. When data deduplication techniques determine the data is already stored in the memory system, the data is not stored in the memory system in duplicate and only a link to already stored data is managed, and thus, storage space may be efficiently used. However, conventional data duplication techniques may be limited in their ability to detect matches.

SUMMARY

Example embodiments provide a memory system including a memory controller configured to reduce the amount of duplicate data by performing half-match deduplication, a method of detecting half-matches in a memory system, and/or a memory controller.

At least some example embodiments relate to a memory system.

In some example embodiments, the memory system includes a memory device configured to store data received from a host; and a memory controller configured to, receive a received block of the data and a logical address associated with the data from the host, detect at least one halves of the received block as being duplicate halves based on whether a respective one of the at least one halves of the received block match one or more existing halves of stored blocks stored in the memory device, selectively store the at least one halves of the received block in the memory device based on whether the respective one of the at least one halves are duplicate halves such that the duplicate halves of the received block are not stored in the memory device, and store metadata associated with retrieving the received block.

At least some example embodiments relate to a method of detecting half-matches in a memory system, the memory system including a memory device and a memory controller.

In some example embodiments, the method includes receiving a received block of data and a logical address associated with the data from a host, detecting at least one halves of the received block as being duplicate halves based on whether a respective one of the at least one halves of the received block match one or more existing halves of stored blocks stored in the memory device, selectively storing the at least one halves of the received block in the memory device based on whether the respective one of the at least one halves are duplicate halves such that the duplicate halves of the received block are not stored in the memory device, and storing metadata associated with retrieving the received block.

At least some example embodiments relate to a memory controller.

In some example embodiments, the memory controller includes a working memory; and processing circuitry configured to, receive a received block of data and a logical address associated with the data from a host, detect at least one halves of the received block as being duplicate halves based on whether a respective one of the at least one halves of the received block match one or more existing halves of stored blocks stored in a memory device, selectively store the at least one halves of the received block in the memory device based on whether the respective one of the at least one halves are duplicate halves such that the duplicate halves of the received block are not stored in the memory device, and store metadata associated with retrieving the received block.

BRIEF DESCRIPTION OF THE DRAWINGS

Example embodiments will be more clearly understood from the following detailed description taken in conjunction with the accompanying drawings in which.

DETAILED DESCRIPTION

Figure 1:
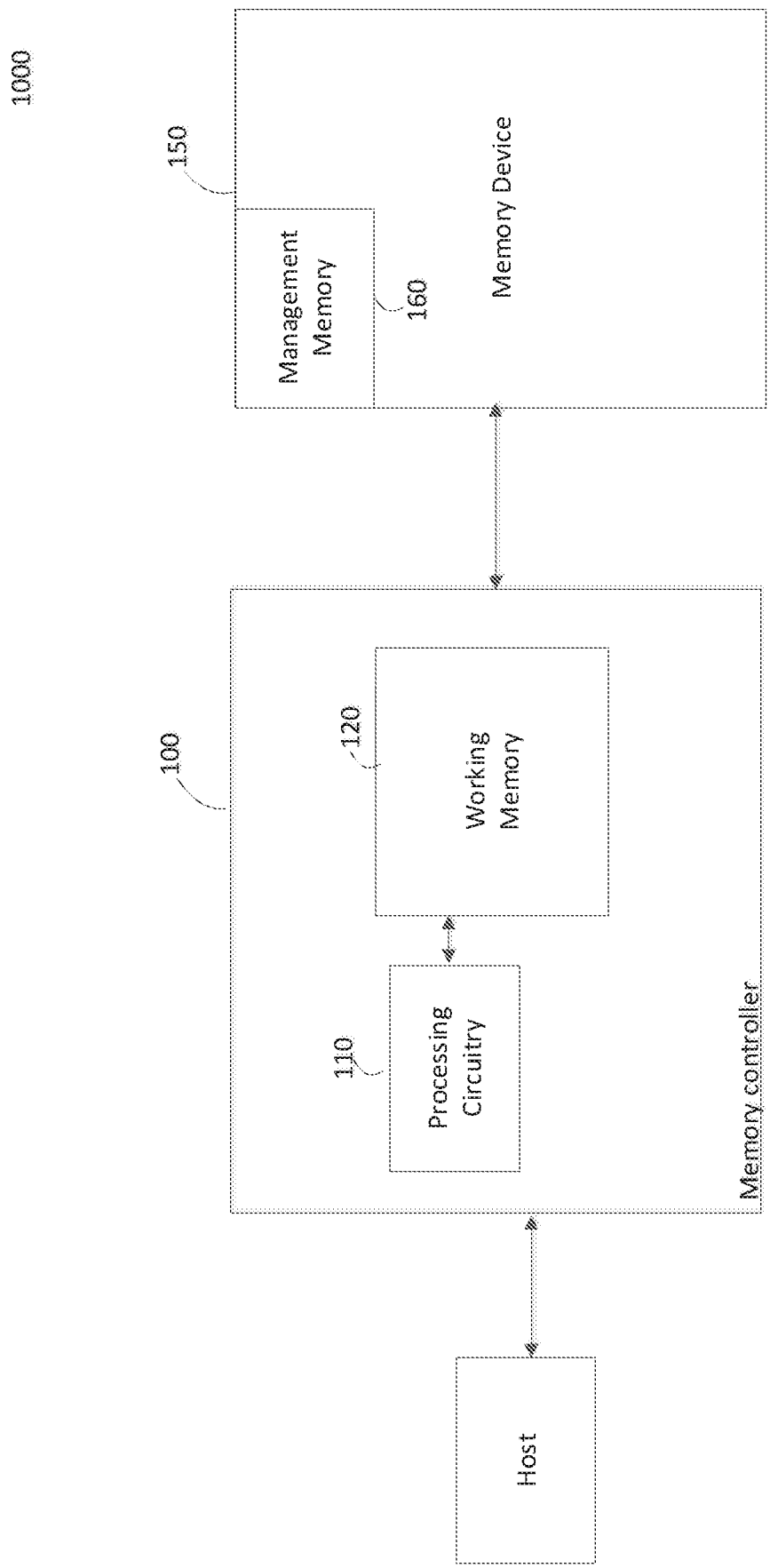
FIG. 1 is a block diagram of a data processing system according to an example embodiment.

Hereinafter, example embodiments will be described in detail with reference to the accompanying drawings.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

FIG. 1 is a block diagram of a data processing system according to an example embodiment.

Referring to FIG. 1, a data processing system may include a memory system 1000 connected to a host, where the memory system 1000 includes a memory controller 100 and a memory device 150. The memory controller 100 may be connected between the host and the memory device 150.

The host may perform management operations of data in the memory system. As an example, the host may provide a data write or read request to the memory system 1000. The host may communicate with the memory system 1000 via various interfaces, such as Universal Serial Bus (USB), MultiMediaCard (MMC), PCI-Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), and Integrated Drive Electronics (IDE).

The memory controller 100 may include processing circuitry 110 and working memory 120.

The memory device 150 may include storage media for storing data upon request from the host. The memory device 150 may include a portion thereof designated as management memory 160 therein.

In some example embodiments, the memory device 150 may be a volatile memory such as random access memory (RAM) or dynamic ram (DRAM). When the memory device 150 consists of volatile memory (such as DRAM), smaller block size may be needed in order to achieve high dedupe ratio. While smaller block size implies higher management space, the half-match algorithm enables reducing this management space while still enjoying most of the benefit of smaller block size.

Deduplication techniques may be used to increase the efficiency of the storage space of the memory system 1000 by determining whether data associated with a write request received from the host is a duplicate of (i.e., is the same as) data already stored in the memory system 1000, and the processing the write request by managing only a link to already stored data instead of storing the data, when the data is already stored in the memory system 1000. Accordingly, a storage space of the memory system 1000 may be more efficiently used.

However, conventional deduplication techniques may not take advantage of the efficiency achieved through deduplication when half of a block of the data associated with the write request matches half of a block of data already stored in the memory system 1000, hereinafter known as a "half-match."

In contrast, in one or more example embodiments, the memory system 1000 may support half-match deduplication. Therefore, the storage space of the memory system 1000 may be more efficiently used.

The memory controller 100 may provide the memory device 150 with a read command and an address during a reading operation, and provide the memory device 150 with a write command, an address, and data block during a writing operation. In addition, the memory controller 100 may convert a logical address received from the host into a physical page address by using metadata stored in the working memory 120.

The working memory 120 may be random access memory (RAM), such as DRAM or SRAM. The working memory 120 may be configured to temporarily store data transmitted from the host and data generated by the processing circuitry 110, or data read out from the memory device 150. Also, the working memory 120 may store metadata read out from the memory device 150.

The metadata stored in the management memory 160 may be information generated by the memory system 1000 in order to manage the memory device 150. The metadata, that is, managing information, includes mapping tables information that is used to convert logical addresses into physical page addresses of the memory device 150. For example, the metadata may include page mapping that is used to perform an address mapping process per page unit. Also, the metadata may include information for managing storage of the memory device 150.

The memory controller 100 controls the memory system 1000 to read the metadata stored in the memory device 150 (e.g., the management memory 160) and store the metadata in the working memory 120, when electric power is supplied to the memory system 1000. The memory controller 100 controls the memory system 1000 to update the metadata stored in the working memory 120. In addition, the memory controller 100 controls the memory system 1000 to write the metadata stored in the working memory 120 in the memory device 150 (e.g., the management memory 160) before the memory system 1000 is turned off.

An operation example related to half-match deduplication according to an example embodiment of the inventive concepts will be described as follows.

As data writing is requested from an external system, the host may receive data and a logical address (LBA) (not shown) corresponding thereto from an external system. The memory system 1000 may receive the data and the logical address LBA from the host, may determine whether the data is a duplicate and perform a deduplication process according to the determination result.

As discussed in more detail below, to determine whether a block of received data contains duplicate data, the memory controller 100 may apply a hash function separately on the left half and the right half of the block to determine whether one or more of the left half and the right half of the block match an existing half block stored in the memory device 150 (a left half of a whole block, or a stored half-block).

Figure 2:
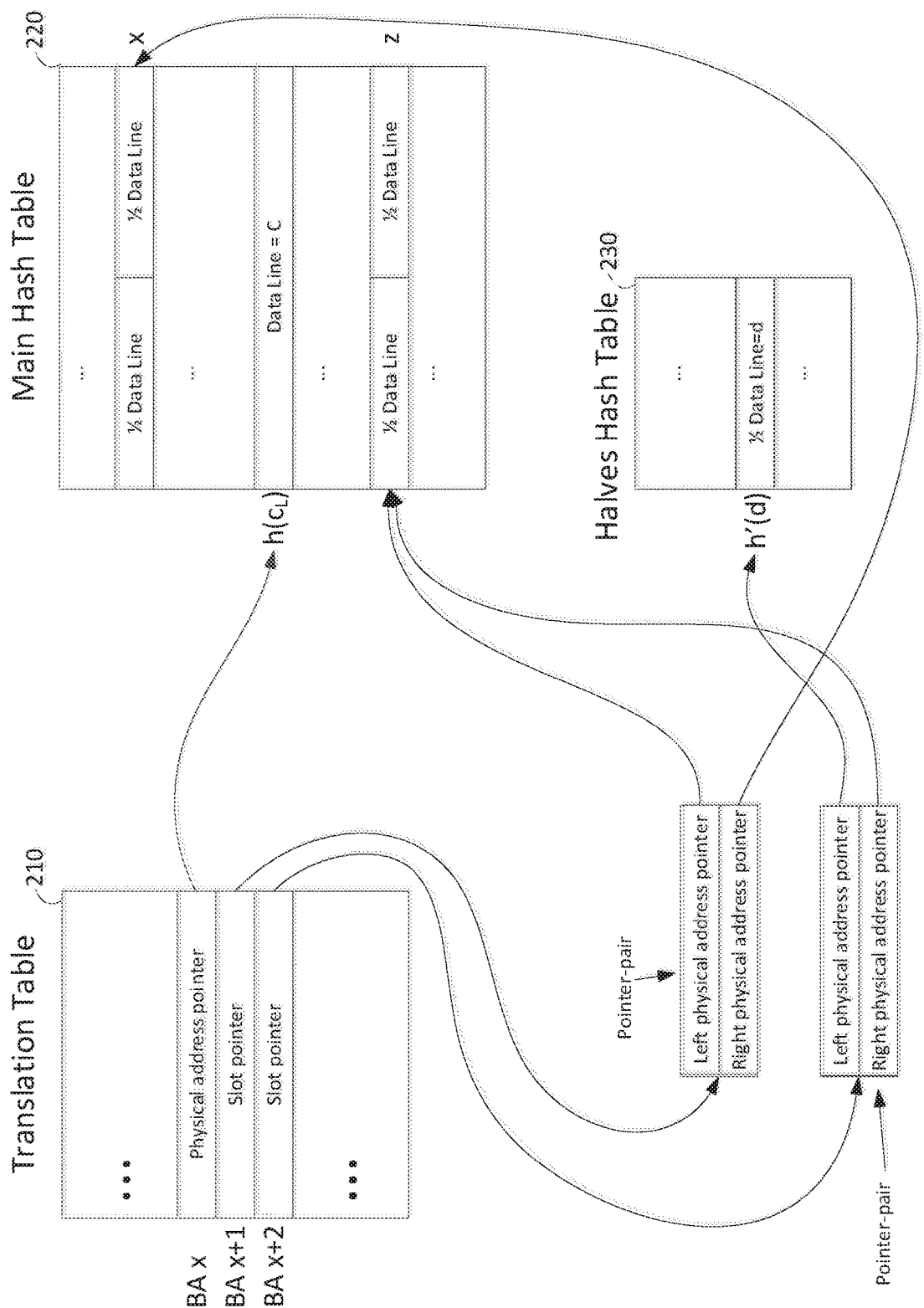
FIG. 2 illustrates management tables utilized by a memory controller to perform half-match deduplication according to an example embodiment.

FIG. 2 illustrates management tables utilized by a memory controller to perform half-match deduplication according to an example embodiment.

Referring to FIG. 2, the memory controller 100 may maintain several tables to perform deduplication.

For example, the memory controller 100 may maintain a translation table 210, a main hash table 220 and a halves hash table 230 within the management memory 160 stored in the volatile memory device 150.

In the translation table 210, the memory controller 100 may store in each line x, a pointer that enables retrieving the data block associated with LBA x.

This pointer may either point to the physical location of the data, or to a special allocated slot that holds two pointers, one pointing to the left half of the block associated with LBA x, and one pointing to the right half of the block associated with LBA x.

In the main hash table 220, the memory controller 100 may store whole data blocks, where the data itself of the left half serves as the key for the hash insertion. Thus, when a new block is inserted by the memory controller 100, by applying the hash function to the left and right halves of the new block, the memory controller 100 can detect whether either of the halves of the new block are identical to the left half of a block in the main hash table 220.

In the halves hash table 230, the memory controller 100 may store half-blocks, where the data itself of the half-block serves as the key for the hash insertion. Thus, when a new block is inserted by the memory controller 100, by applying the hash function to the left and right halves of the new block, the memory controller 100 can detect whether either of the left and right halves of the new block is identical to a half-block in the halves-hash table 230.

As discussed in more detail below with reference to FIG. 3, upon receiving a block from the host, the memory controller 100 may detect whether one or more halves of the received block is duplicate of data already stored in the main hash table 220 using an underlying hash function associated with the main hash table 220 denoted h($C_L$), where $C_L$ is the content of the left half of the block, or in the half-blocks of data stored in the halves hash table 230 using an underlying hash function h'(d) associated with the halves hash table 230, where d is the data stored therein. Upon such half-block duplicate detection, when the other half of the received block is unique, the unique half may be saved in the halves hash table 230, in order to consume the space of half a block, and not a whole block as in the main hash table 220 and the duplicate half-block may be stored as a pointer in the translation table 210.

In one or more example embodiments, the aforementioned tables may be stored in volatile memory (e.g., in the management memory 160) of the memory device 150 along with the data itself. By storing both the management tables 210, 220 and 230 and the data in the volatile memory, the space allocated to the management tables 210, 220 and 230 may be dynamically adjusted.

Figure 3:
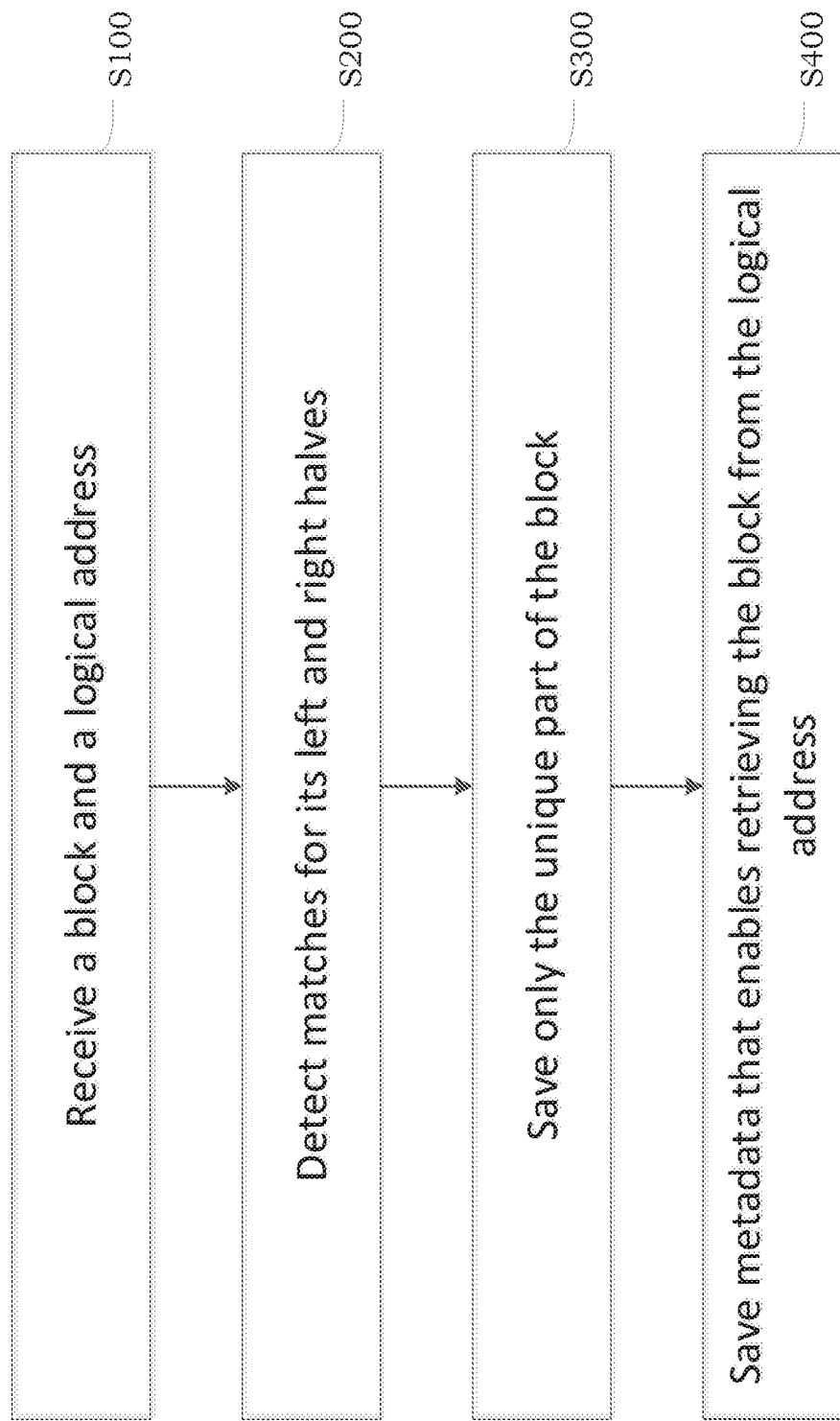
FIG. 3 illustrates a flowchart of a method of storing data utilizing half-match deduplication according to an example embodiment.

FIG. 3 illustrates a flowchart of a method of storing data utilizing half-match deduplication according to an example embodiment.

Analyzing Existing Left Half Blocks

Referring to FIG. 3, in operation S100, the memory system 1000 may receive a block and a logical address LBA from the host.

In operation S200, the memory controller 100 may detect whether a half-match exists by applying a hash function on the left and right halves of the received block to detect whether one or more halves (e.g., a left half and/or a right half) of the received block matches a left half or a half-block already stored in the memory device 150 or whether the one or more halves of the received block are unique.

Operation S200 will be described in more detail with reference to FIG. 4. For example, with reference to operations S210, 220, S240, S270 and S280 of FIG. 4

In operation S300, the memory controller 100 may save a whole block, or only a unique half of the block to the memory device 150.

In operation S400, the memory controller 100 may save metadata associated with the whole block, or with both halves of the block, where the metadata allows the memory controller 100 to retrieve the block when the blocks LBA is requested from the host.

Operations S300 and S400 will be described in more detail below. For example, operations S300 and S400 may be may be performed after the determinations in each of operations S230, S250, S260, S290 and S300 of FIG. 4.

Figure 4:
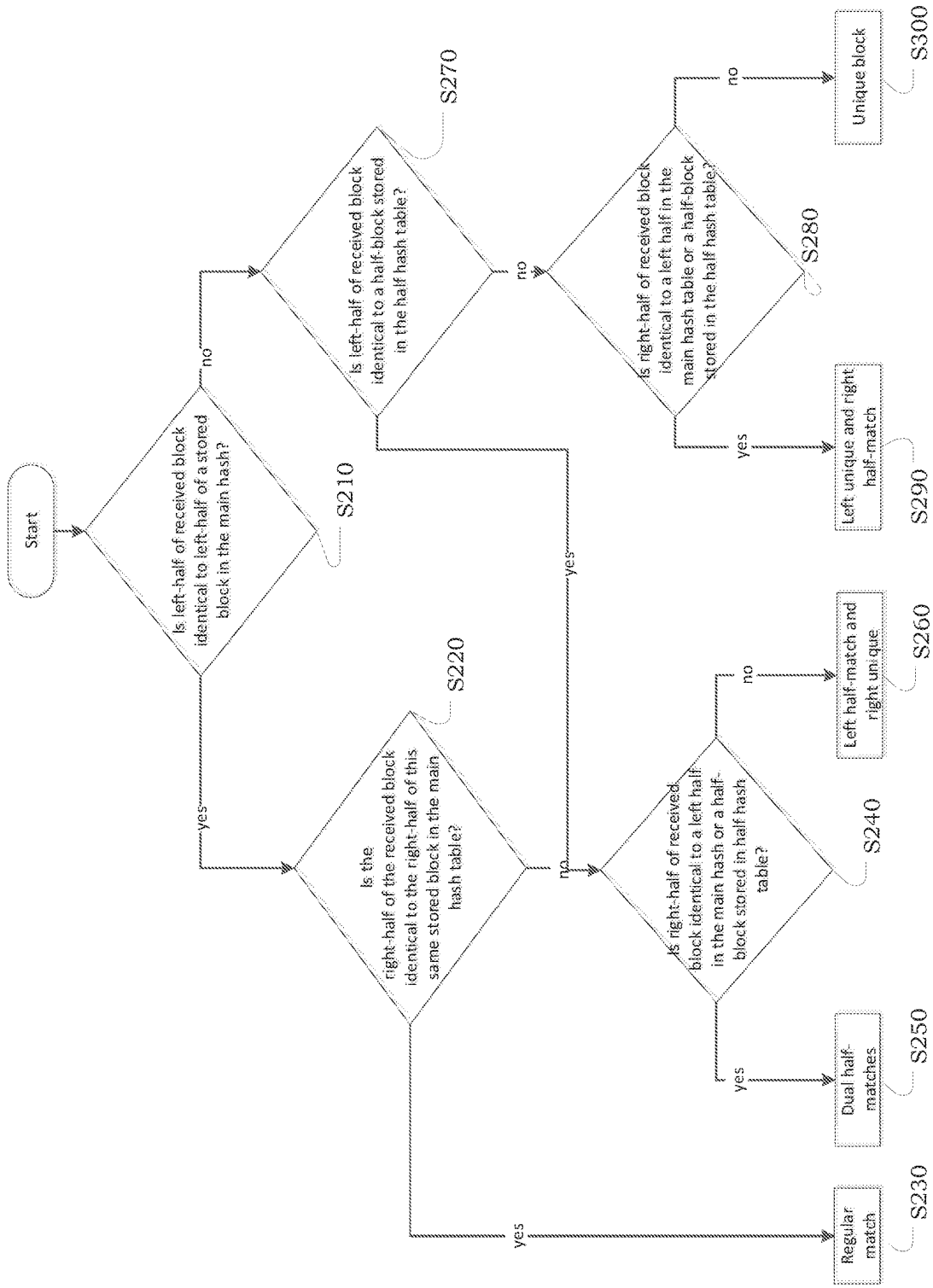
FIG. 4 illustrates a flowchart of a method of detecting half-matches according to an example embodiment.

FIG. 4 illustrates a flowchart of a method of detecting half-matches according to an example embodiment.

Referring to FIG. 4, in operation S210, the memory controller 100 may determine whether the left half of the received block matches a left half of one of the stored blocks by performing a lookup in the main hash table 220 using the left half of the received block as the key.

If the left half of the received block matches the left half of one of the stored blocks, (YES in operation S210), then in operation S220, the memory controller 100 may determine whether the right half of the received block matches the right half of this same stored block using the main hash table 220.

For example, the memory controller 100 may read the right half of this same block and compare this read right half with the right half of received block.

If both the left half and the right half of the received block match the left half and the right half, respectively, of one of the stored blocks, (YES in operation S220), then, in operation S230, the memory controller 100 determines that a regular match occurs and performs deduplication. Regular match deduplication of operation S230 will be discussed in more detail below.

In contrast, if only the left half of the received block matches the left half of one of the stored blocks (NO in operation S220), in operation S240, the memory controller 100 may determine whether the right half of the received block matches the left half of a stored block or a stored half-block using the main hash table 220 and the halves-hash tables 230, respectively.

For example, the memory controller 100 may perform a look-up operation in the main hash table 220 and the halves-hash table 230 using the right half of the received block as the key.

If the left half of the received block match the left half of one of the stored blocks and the right half of the received block match a left half or half-block stored in memory (YES in operation S240), then in operation S250, the memory controller 100 may determine that dual-half matches exist and perform half-match deduplication accordingly. Dual-Half match deduplication of operation S250 will be discussed in more detail below.

In contrast, if the left half of the received block matches the left half of one of the stored blocks and the right half of the received block is unique, then, as discussed in more detail below, in operation S260, the memory controller 100 may determine only a left half match exists, and perform half-match deduplication accordingly.

Referring back to operation S210, if the left half of the received block does not match the left half of one of the stored blocks, (NO in operation S210), then in operation S270, the memory controller 100 may determine whether the left half of the received block matches a half-block.

For example, the memory controller 100 may perform a lookup in the halves hash table 230 using the left half of the received block as the key.

If left half of the received block matches a half-block stored in memory (YES in operation S270), the memory controller 100 resumes to S240 as described above.

In contrast, if the left half of the received block does not match a half-block stored in memory (No in operation S270), then in operation S280, the memory controller 100 may determine whether the right half of the received block matches a left half or a half-block stored in memory by performing a lookup in the main hash table 220 and the halves-hash table 230, respectively, using the right half of the received block as the key.

If the left half of the received block is unique but the right half of the received block matches a left half or a half-block stored in memory (YES in operation S280), then in operation S290, the memory controller 100 may determine only a right half match exists, and perform half-match deduplication accordingly. Right half match deduplication of operation S290 will be discussed in more detail below.

In contrast, if both the left half and the right half of the received block are unique (NO in operation S280), then in operation S300, the memory controller 100 may determine that the received block is unique and store the memory block without performing deduplication. Unique block storage without deduplication of operation S300 will be discussed in more detail below.

As discussed above, the memory controller 100 may analyze whether each half of a received block matches halves of a stored block, and, thereafter, may differently perform deduplication based on whether the memory controller 100 determines that the situation is a regular match (operation S230), a dual half-match (operation S250), left half match and right half unique (operation S260), left half unique and right half match (operation S290), or whether the entire block is unique (operation S300).

In operation S230 (regular match), the memory controller 100 may point to the identified existing block in the memory by linking the logical address LBA received from the host to the physical address of the block identified by the memory controller 100.

In operation S250 (dual-half matches), the memory controller 100 may point to each of the two existing halves by allocating a slot for two pointers, linking the logical address LBA received from the host to the physical address of the allocated slot, setting the left pointer and the right pointer in the slot to point to the physical addresses of the half blocks that match the left half and the right half of the received block, respectively.

As discussed in more detail below, in operations S260 and S290 (half matches), the memory controller 100 may point to the existing half in the main hash table 220, or in the halves hash table 230 and store the other half in the halves-hash table 230.

More specifically, in operation S260 (left half match), the memory controller 100 may insert the right half into the halves-hash table 230 and may allocate a slot for two pointers. Thereafter, the memory controller 100 may link the logical address LBA received from the host to the physical address of the allocated slot by inserting the physical address to the slot who's index is the LBA in the translation table 210, set the left pointer of the slot to point to the physical address of the half-block that matches the left half of the received block, and set the right pointer in the slot to point to the physical address of the inserted right half of the received block.

Likewise, in operation S290 (right half match), the memory controller 100 may insert the left half into the halves-hash table 230 and may allocate a slot for two pointers. Thereafter, the memory controller 100 may link the logical address LBA received from the host to the physical address of the allocated slot, set the left pointer of the slot to point to the physical address of the inserted left half of the received block, and set the right pointer of the slot to point to the physical address of the half block that matches the right half of the received block.

In operation S300 (unique block), since the block is unique, to store the block and allow future deduplication, the memory controller 100 may insert the block into the main hash table 220, and link the logical address LBA received from the host to the physical address of the inserted block by inserting the physical address to the slot who's index is the LBA in the translation table 210.

Expansion to Analyzing Existing Right Half-Blocks Using a Background Algorithm

The aforementioned method discussed with reference to FIG. 4 allows the memory controller 100 to detect new half blocks that are identical to existing left halves of whole blocks, or to stored half-blocks, but not to right halves of stored blocks. In other example embodiments, the memory controller 100 may also detect whether a left half of a new inserted block is identical to existing right half-blocks, by using a background algorithm.

The memory controller 100 may execute a background algorithm to sequentially (and round-robin) visit all LBA's in the translation table 210, and for each visited LBA, read the data in the pointed physical address; apply the hash function on the right half; and perform a hash lookup on the result.

Having found such half-match, the memory controller 100 may insert the left half into the halves-hash table 230 and may allocate a slot for two pointers. Thereafter, the memory controller 100 may link the visited logical address LBA to the physical address of the allocated slot by inserting the physical address to the slot who's index is the LBA in the translation table 210, set the left pointer of the slot to point to the physical address of the inserted left half of the received block, and set the right pointer of the slot to point to the physical address of the matching right half block.

As discussed above, in one or more example embodiments, the memory controller 100 may increase the deduplication ratio by analyzing half of a block to detect half-matches therein, thus saving data space in the memory system 1000

When the management memory 160 is allocated from the main memory device 150, then, using dynamic hash tables that extend with utilization, the memory controller 100 dynamically adjusts the size of the management memory 160 such that the extra memory space required for the half-match deduplication management is allocated by-demand. Thus, on one extreme, when half-match deduplication is not used, performance is (nearly) unharmed compared to a regular deduplication algorithm, and the deduplication ratio remains as is; and when used the new management space utilized by the half-match algorithm grows with the amount of half-matches. In contrast, a conventional deduplication scheme, where data is saved on non-volatile (e.g., flash) memory while management is on volatile memory, the space allocated to management is fixed, and, thus the system may not be dynamic.

In order to keep track on the number of LBA's pointing to each hash entry half, and to determine which slots or half-slots are empty (i.e., no LBA is pointing to them), the memory controller 100 may maintain, for each hash entry, two "reference counters", one for each halve of the respective hash entry. These pointers will be increased and decreased as new LBA's point to their respective half-blocks, or removed from pointing to them.

A possible issue may arrive when performing the aforementioned deduplication method in which slots in the main hash table may hold only half a data line, hereinafter referred to "half-holes." This can happen if the memory controller 100 inserts a whole data line, then inserts a new data line that matches half of the previous, and then removes the first data line (i.e., overwrite its LBA).

In order to deal with such half holes, the memory controller 100 may execute another background algorithm to fix such holes. For example, the memory controller 100 may spot and remove every half-hole by detecting an LBA pointing to half a data line where the other half of the data line has reference count equal 0, and upon such detection:

Copy the valid half data line to a slot in the halves hash;
Change the relevant pointer to point to the slot;
Decrement the reference counter of this half; and
If the reference counter equals 0, remove the whole data line.

In some example embodiments, the memory controller 100 may implement the two aforementioned background algorithms in one process.

For example, the memory controller 100 may execute the following pseudo-code to execute the two background algorithms:

1. x=0;
2. Do forever{
  2.1. If entry x in the translation array contains a pointer p{
    2.1.1. If p points to the main hash{// p points to a full slot
      2.1.1.1. Read c, the CL in p;
// Check whether $c_R$ matches some left half that was inserted later.
      2.1.1.2. Lookup $c_R$ in the main hash and halves-hash. If found (denote the address p'){
        2.1.1.2.1. Insert $c_L$, in the halves-hash (denote the address p")
        2.1.1.2.2. Allocate a new pointers slot and update the two pointers to (p',p").
        2.1.1.2.3. Update x to point to the pointers slot.
        2.1.1.2.4. Decrease the RC's at p.
    2.1.2. }
    2.1.3. Else{// p points to a pointers-pair ($p_L$, $p_R$).
      2.1.3.1. If $p_L$ points to a slot with a half-hole (RC=(>0,0)){
        2.1.3.1.1. Insert the left half CL to the halves hash, denote the address p';
        2.1.3.1.2. Decrement the left RC at $p_L$.
        2.1.3.1.3. Change $p_L$=p'.
      2.1.3.2. }
      2.1.3.3. If $p_R$ points to a slot with a half-hole (RC=(>0,0){
        2.1.3.3.1. Insert the left half CL to the halves hash, denote the address p';
        2.1.3.3.2. Decrement the left RC at $p_R$.
        2.1.3.3.3. Change $p_R$=p'.
      2.1.3.4. }
    2.1.4. }
  2.2. }
  2.3. x++
  2.4. If x=MAX_LBA then x=0;
3. }//do forever Synchronization FIG. 5 illustrates synchronizing a main and a background process according to an example embodiment.

In order to balance between the performance of the main algorithm (supporting I/O operations) and the background process (improving the dedupe ratio by detecting whether a left half of a new inserted block matches existing right half-blocks and/or removing half-holes), the following scheme is used. The scheme uses a variable new_store_ops, that counts the number of new insertions since its last reset.

Figure 5:
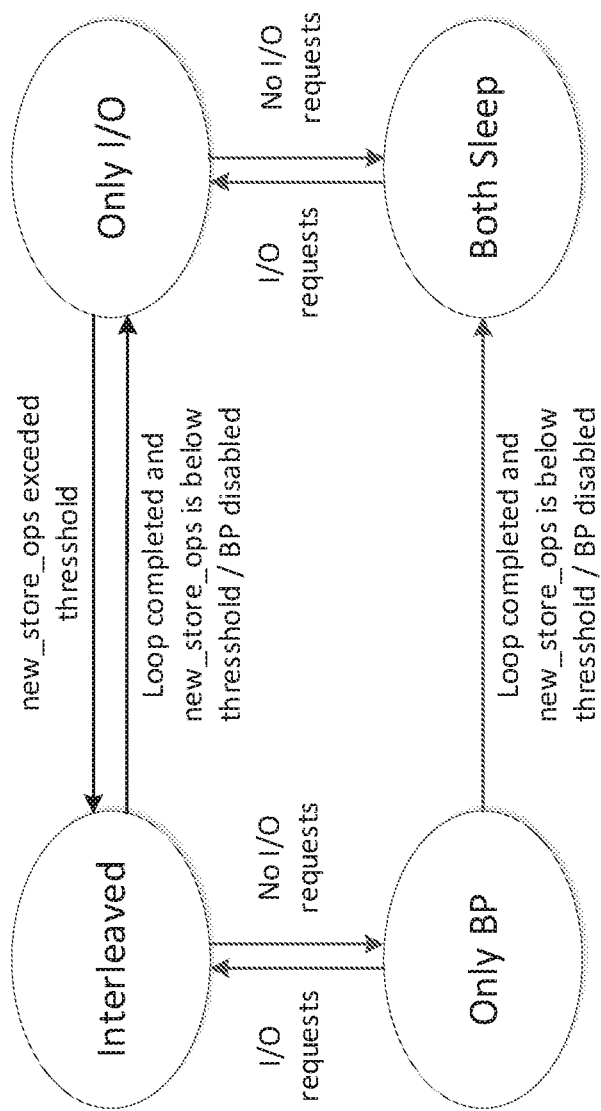
FIG. 5 illustrates synchronizing a main and a background process according to an example embodiment.

Referring to FIG. 5, the memory controller 100 may switch between an interleaved state, an I/O state, a Background Process (BP) state, and a Sleep state.

In the I/O state, the memory controller 100 performs only write and read operations.

In the BP state, the memory controller 100 performs only the background process to detect whether a left half of a new inserted block matches an existing (e.g., a pre-existing) right half-block.

In interleaved state, the memory controller 100 shares process time between the previous I/O and BP states.

In sleep mode, the system does not do anything.

When only one of the I/O tasks and the BP tasks are required, the memory controller 100 performs only the one of the I/O and the BP tasks.

When none of the I/O and BP tasks are required, the memory controller 100 enters sleep state.

The memory controller 100 wakes up the BP tasks when the variable new_store_ops exceeds a desired (or, alternatively, a predefined) threshold value, and resets new_store_ops to perform a new loop when the expected dividend is high enough.

As discussed above, in one or more example embodiments, the memory system 1000 may support half-match deduplication. Therefore, the storage space of the memory system 1000 may be more efficiently used.

While example embodiments have been particularly shown and described with reference to embodiments thereof, it will be understood that various changes in form

What is claimed is:

1. A memory system comprising:
    a memory device configured to store data received from a host; and
    a memory controller configured to,
        receive a received block of the data and a logical address associated with the data from the host,
        detect at least one halves of the received block as being duplicate halves based on whether a respective one of the at least one halves of the received block match one or more existing halves of stored blocks stored in the memory device as a regular match or a half match,
        selectively store the at least one halves of the received block in the memory device based on whether the respective one of the at least one halves are duplicate halves such that the duplicate halves of the received block are not stored in the memory device, and
        store metadata associated with retrieving the received block,
    wherein the memory controller is configured to,
        to determine if the at least one halves of the received block is a regular match, apply a first hash function to a left half of the received block to compare left halves of the stored blocks in a main-hash table, and compare a right half of the received block to right half of a matched block of the stored blocks, and
        to determine if the at least one halves of the received block is a half match, apply a second hash function to the left half of the received block to compare stored halves in a halves-hash table, and apply the first hash function to the right half of the received block to compare the left halves of the stored blocks, or apply the second hash function to the right half of the received block to compare the stored halves.

2. The memory system of claim 1, wherein the memory controller is configured to detect the at least one halves of the received block are the duplicate halves by determining whether the received block includes a regular match, a dual half match, a left half match, a right half match or a unique block.

3. The memory system of claim 2, wherein
    if the memory controller determines that the received block is the regular match, the memory controller is configured to perform deduplication by pointing a logical block address (LBA) associated with the received block to both of the one or more existing halves of a same one of the stored blocks,
    if the memory controller determines that the received block is the dual half match, the memory controller is configured to perform deduplication by pointing the LBA associated with the received block to two of the one or more existing halves of different ones of the stored blocks,
    if the memory controller determines that the received block includes the left half match or the right half match, the memory controller is configured to perform deduplication by inserting a unique half of the received block into the halves-hash table, and creating a pair of pointers including a first pointer and a second pointer such that the first pointer associated with a duplicate half of the received block points to one of the one or more existing halves and the second pointer points to the unique half of the received block inserted into the halves-hash table, and
    if the memory controller determines that the received block includes the unique block, the memory controller is configured to skip performing deduplication by inserting the unique block in the main hash table, and pointing the LBA associated with the received block to the LBA of the unique block in the main hash table.

4. The memory system of claim 2, wherein the memory controller is configured to,
    determine whether the left half of the received block is same as the left half of a first one of the stored blocks,
    determine whether the right half of the received block is same as the right half of the first one of the stored blocks, if the left half of the received block is same as the left half of the first one of the stored blocks, and
    set the received block as including the regular match, if the left half and the right half of the received block is same as the left half and the right half of the first one of the stored blocks, respectively.

5. The memory system of claim 4, wherein the memory controller is further configured to,
    determine whether the right half of the received block is same as the left half of any second one of the stored blocks or a half block, if the left half of the received block is same as the left half of the first one of the stored blocks while the right half of the received block is different from the right half of the first one of the stored blocks, the half block being an entry stored in the halves-hash table,
    set the received block as being the dual half match, if the right half of the received block is same as the left half of any second one of the stored blocks or the half block while the right half of the received block is same as the left half of the second one of the stored blocks or the half block, and
    set the received block as being the left half match, if the right half of the received block is different from the left half of any second one of the stored blocks or the half block while the left half of the received block is same as the left half of any second one of the stored blocks or the half block.

6. The memory system of claim 2, wherein the memory controller is configured to,
    determine whether the left half of the received block is same as the left half of a first one of the stored blocks, and
    determine whether the left half of the received block is same as a half block, if the left half of the received block is different from the left half of the first one of the stored blocks, the half block being an entry stored in the halves-hash table.

7. The memory system of claim 6, wherein the memory controller is configured to,
    determine whether the right half of the received block is same as the left half of any second one of the stored blocks or a half block, if the left half of the received block is different from the left half of the first one of the stored blocks and same as the half block,
    set the received block as including the dual half match, if the right half of the received block is same as the left half of the second one of the stored blocks or the half block, and
    set the received block as including the left half match, if the right half of the received block is different from the left half of any second one of the stored blocks or the half block.

8. The memory system of claim 6, wherein the memory controller is configured to, determine whether the right half of the received block is same as a left half of any second one of the stored blocks or a half block, if the left half of the received block is different from the left half of the first one of the stored blocks and same as the half block, set the received block as including the right half match, if the right half of the received block is same as the left half of any second one of the stored blocks or the half block, and set the received block as including the unique block, if the right half of the received block is different from the left half of any second one of the stored blocks or the half block.

9. The memory system of claim 1, wherein the memory device is a volatile memory device, and the memory controller is configured to store both the at least one more halves of the received block that are unique and the metadata in the volatile memory device.

10. The memory system of claim 9, wherein the memory controller is configured to, store the meta data associated with retrieving the received block in a management table stored in the volatile memory, and dynamically vary a size of the volatile memory device allocated to management tables associated with the metadata based on actual utilization of the management tables.

11. A method of detecting half-matches in a memory system, the memory system including a memory device and a memory controller, the method comprising:

receiving a received block of data and a logical address associated with the data from a host, detecting at least one halves of the received block as being duplicate halves based on whether a respective one of the at least one halves of the received block match one or more existing halves of stored blocks stored in the memory device, selectively storing the at least one halves of the received block in the memory device based on whether the respective one of the at least one halves are duplicate halves such that the duplicate halves of the received block are not stored in the memory device, and storing metadata associated with retrieving the received block, wherein determine if the at least one halves of the received block is a regular match, the memory controller applies a first hash function to a left half of the received block to compare left halves of the stored blocks in a main-hash table, and compares a right half of the received block to right half of a matched block of the stored blocks, and to determine if the at least one halves of the received block is a half match, the memory controller applies a second hash function to the left half of the received block to compare stored halves in a halves-hash table, and applies the first hash function to the right half of the received block to compare the left halves of the stored blocks, or applies the second hash function to the right half of the received block to compare the stored halves.

12. The method of claim 11, wherein the detecting comprises:

first determining whether the received block includes a regular match, a dual half match, a left half match, a right half match or a unique block.

13. The method of claim 12, wherein the method further comprises:

performing deduplication on the received block by, pointing a logical block address (LBA) associated with the received block to both of the one or more existing halves of a same one of the stored blocks, if the first determining determines that the received block is the regular match, pointing the LBA associated with the received block to two of the one or more existing halves of different ones of the stored blocks, if the first determining determines that the received block is the dual half match, and inserting a unique half of the received block into the halves-hash table, and creating a pair of pointers including a first pointer and a second pointer such that the first pointer associated with a duplicate half of the received block points to one of the one or more existing halves and the second pointer points to the unique half of the received block inserted into the halves-hash table, if the first determining determines that the received block includes the left half match or the right half match; and skipping performing deduplication by inserting the unique block in the main hash table, and pointing the LBA associated with the received block to the LBA of the unique block in the main hash table, if the first determining determines that the received block includes the unique block.

14. The method of claim 12, wherein the first determining comprises:

determining whether the left half of the received block is same as the left half of a first one of the stored blocks, determining whether the right half of the received block is same as the right half of the first one of the stored blocks, if the left half of the received block is same as the left half of the first one of the stored blocks, and setting the received block as including the regular match, if the left half and the right half of the received block is same as the left half and the right half of the first one of the stored blocks, respectively.

15. The method of claim 14, wherein the first determining further comprises:

determining whether the right half of the received block is same as the left half of any second one of the stored blocks or a half block, if the left half of the received block is same as the left half of the first one of the stored blocks while the right half of the received block is different from the right half of the first one of the stored blocks, the half block being an entry stored in the halves-hash table, setting the received block as being the dual half match, if the right half of the received block is same as the left half of any second one of the stored blocks or the half block while the right half of the received block is same as the left half of the second one of the stored blocks or the half block, and setting the received block as being the left half match, if the right half of the received block is different from the left half of any second one of the stored blocks or the half block while the left half of the received block is same as the left half of any second one of the stored blocks or the half block.

16. The method of claim 12, wherein the first determining comprises:

determining whether the left half of the received block is same as the left half of a first one of the stored blocks, and determining whether the left half of the received block is same as a half block, if the left half of the received block is different from the left half of the first one of the stored blocks, the half block being an entry stored in the halves-hash table.

17. The method of claim 16, wherein the first determining further comprises:
determining whether the right half of the received block is same as the left half of any second one of the stored blocks or a half block, if the left half of the received block is different from the left half of the first one of the stored blocks and same as the half block,
setting the received block as including the dual half match, if the right half of the received block is same as the left half of the second one of the stored blocks or the half block, and
setting the received block as including the left half match, if the right half of the received block is different from the left half of any second one of the stored blocks or the half block.

18. The method of claim 16, wherein the first determining further comprises:
determining whether the right half of the received block is same as a left half of any second one of the stored blocks or a half block, if the left half of the received block is different from the left half of the first one of the stored blocks and same as the half block,
setting the received block as including the right half match, if the right half of the received block is same as the left half of any second one of the stored blocks or the half block, and
setting the received block as including the unique block, if the right half of the received block is different from the left half of any second one of the stored blocks or the half block.

19. The method of claim 11, wherein the memory device is a volatile memory device, and the memory controller is configured to selectively storing the one or more halves of the received block and the metadata stores both the one or more halves of the received block and the metadata in the volatile memory device.

20. A memory controller comprising:
a working memory; and
processing circuitry configured to,
receive a received block of data and a logical address associated with the data from a host,
detect at least one halves of the received block as being duplicate halves based on whether a respective one of the at least one halves of the received block match one or more existing halves of stored blocks stored in a memory device,
selectively store the at least one halves of the received block in the memory device based on whether the respective one of the at least one halves are duplicate halves such that the duplicate halves of the received block are not stored in the memory device, and
store metadata associated with retrieving the received block, wherein the memory controller is configured to,
to determine if the at least one halves of the received block is a regular match, apply a first hash function to a left half of the received block to compare left halves of the stored blocks in a main-hash table, and compare a right half of the received block to right half of a matched block of the stored blocks, and
to determine if the at least one halves of the received block is a half match, apply a second hash function to the left half of the received block to compare stored halves in a halves-hash table, and apply the first hash function to the right half of the received block to compare the left halves of the stored blocks, or apply the second hash function to the right half of the received block to compare the stored halve.

* * * * *